US012356503B2

(12) United States Patent
Urie

(10) Patent No.: US 12,356,503 B2
(45) Date of Patent: Jul. 8, 2025

(54) ADDING PER-USER EQUIPMENT CONTROLS TO RADIO INTELLIGENT CONTROLLER E2 POLICY

(71) Applicant: NOKIA SOLUTIONS AND NETWORKS OY, Espoo (FI)

(72) Inventor: Alistair Urie, Issy les Moulineaux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 381 days.

(21) Appl. No.: 17/909,580

(22) PCT Filed: Mar. 5, 2021

(86) PCT No.: PCT/EP2021/055675
§ 371 (c)(1),
(2) Date: Sep. 6, 2022

(87) PCT Pub. No.: WO2021/176092
PCT Pub. Date: Sep. 10, 2021

(65) Prior Publication Data
US 2023/0110387 A1    Apr. 13, 2023

Related U.S. Application Data

(60) Provisional application No. 62/986,403, filed on Mar. 6, 2020.

(51) Int. Cl.
*H04W 48/02* (2009.01)
*H04W 8/18* (2009.01)

(52) U.S. Cl.
CPC ........... *H04W 8/186* (2013.01); *H04W 48/02* (2013.01)

(58) Field of Classification Search
CPC ........ H04W 8/186; H04W 8/18; H04W 48/02
USPC ........................................................ 455/418
See application file for complete search history.

(56) References Cited

U.S. PATENT DOCUMENTS

| 2014/0199996 A1* | 7/2014 | Wang | H04W 36/1446 |
| | | | 455/552.1 |
| 2015/0201089 A1* | 7/2015 | Raleigh | H04M 15/70 |
| | | | 455/414.1 |
| 2016/0352445 A1* | 12/2016 | Wu | H04W 4/70 |

FOREIGN PATENT DOCUMENTS

| CN | 110024326 A | 7/2019 |
| CN | 110402604 A | 11/2019 |
| EP | 3 099 088 A1 | 11/2016 |

OTHER PUBLICATIONS

Office Action dated Sep. 9, 2024, corresponding to European Patent Application No. 21 712 422.1-1206.
(Continued)

*Primary Examiner* — Qutbuddin Ghulamali
(74) *Attorney, Agent, or Firm* — SQUIRE PATTON BOGGS (US) LLP

(57) ABSTRACT

Systems, methods, apparatuses, and computer program products for adding per-user equipment controls to radio intelligent controller E2 policies. A method may include receiving a subscription procedure including an event trigger. The method may also include detecting the event trigger for a user equipment (UE), and determining whether the UE is a member of a UE list. The method may further include executing an ongoing process based on the detection and whether the UE is a member of the UE list.

17 Claims, 21 Drawing Sheets

(56) References Cited

OTHER PUBLICATIONS

First Office Action dated Mar. 19, 2024 corresponding to Chinese Patent Application No. 202180033721.0, with English summary thereof.

International Search Report and Written Opinion dated Apr. 15, 2021 corresponding to International Patent Application No. PCT/EP2021/055675.

Huawei Tech (UK) Co et al., "Draft-DGR/MEC-00315GIntegration v2.0.9 (GR MEC 031)," ETSI Draft; MEC(19) 000495, vol. ISG MEC Multi-access Edge Computing, No. 2.0.9, Dec. 12, 2019, pp. 1-47, XP014357150.

Office Action dated Jan. 4, 2023, corresponding to Indian Patent Application No. 202247055566.

Huawei Tech (UK) Co et al: "Draft—DGR/MEC-00315Gintegration v2.0.9 (GR MEC 031 )", ETSI Draft; MEC(19) 000495, European Telecommunications Standards Institute (ETSI), 650, Route Des Lucioles; F-06921 Sophia-Antipolis; France val. ISG MEC Multi-access Edge Computing, No. 2.0.9 Dec. 12, 2019,pp. 1-47.

Office Action dated Aug. 17, 2023, corresponding to Japanese Patent Application 2022-533600.

\* cited by examiner

| Attribute Name | Data Type | P | Cardinality | Description | Applicability |
|---|---|---|---|---|---|
| ue_id | String | "C" | "0..1" | UE identifier based on RAN UE Id [12]&[13] | identifies a single UE |
| group_id | String | "C" | "0..1" | identifer of a pre-defined group of UEs, SPID [14] | identifies a group of UEs |
| slice_id | String | "C" | "0..1" | network slice identifier, NSSAI [15] | identifies a slice |
| qos_id | String | "C" | "0..1" | QoS identifier, 5QI [5] | identifies a QoS Flow |
| cell_id | String | "C" | "0..1" | network resource identifier related to cells [15] | identifies a cell |

FIG. 3

| Attribute name | Data type | P | Cardinality | Description | Applicability |
|---|---|---|---|---|---|
| cell_id_list | Array | "M" | "1..N" | list of CellIDs, see section 4.2.6.1 | |
| preference | preference_type | "M" | "1" | the preference of cell usage [shall/prefer/avoid/forbid]. | |
| primary | true/false | "O" | "0..1" | indicates applicability to the selection of primary cell | |

FIG. 4

| Scope identifier<br>Policy statement | ue_id | group_id | slice_id | qos_id | cell_id |
|---|---|---|---|---|---|
| qos_target | 1 | 0..1 | 0 | 1 | 0..1 |
| qos_target | 1 | 0 | 0..1 | 1 | 0..1 |
| qos_target | 0 | 1 | 0 | 1 | 0..1 |
| qos_target | 0 | 0 | 1 | 1 | 0..1 |
| qos_target | 1 | 0 | 0 | 1 | 0..1 |
| traffic_steering_preference | 0 | 0 | 0..1 | 0..1 | 0..1 |
| traffic_steering_preference | 1 | 0 | 1 | 0..1 | 0..1 |
| qoe_target | 1 | 0 | 0 | 1 | 0..1 |
| qoe_target | 0 | 0 | 1 | 0..1 | 0..1 |
| qoe_target | 0 | 0 | 0 | 1 | 0..1 |

FIG. 5

| IE/Group Name | Presence | Range | IE type and reference | Semantics description |
|---|---|---|---|---|
| Sequence of RAN UE Group | | 0..\<maxofRANu eGroups\> | | |
| >RAN UE Group ID | M | | 8.3.14 | |
| >RAN UE Group Definition | M | | 8.3.15 | Defines RAN UE group |
| >RAN Imperative Policy | M | | 8.3.16 | Defines policy to be applied to RAN UE Group |

FIG. 10

| IE/Group Name | Presence | Range | IE type and reference | Semantics description |
|---|---|---|---|---|
| RAN UE Group ID | M | | INTEGER | |

FIG. 11

| IE/Group Name | Presence | Range | IE type and reference | Semantics description |
|---|---|---|---|---|
| Sequence of RAN Parameters | | 0..<maxofRANp arameters> | | Defines RAN UE group |
| >RAN Parameter ID | M | | 8.3.7 | |
| >RAN Parameter Test Condition | M | | 8.3.8 | |
| >RAN Parameter Value | M | | 8.3.9 | |

FIG. 12

| IE/Group Name | Presence | Range | IE type and reference | Semantics description |
|---|---|---|---|---|
| Sequence of RAN Parameters | | 0..<maxofRAN parameters> | | Defines RAN UE group |
| >RAN Parameter ID | M | | 8.3.7 | |
| >RAN Parameter Value | M | | 8.3.9 | |

FIG. 13

| Use Case | RIC Service | Semantics description |
|---|---|---|
| EN-DC Admission Control | E2 POLICY Style 1 on E2 Node of type en-gNB | Event Trigger Definition type 1 = Incoming X2 SgNB Addition Request from eNB<br><br>RAN UE Group Definition = AND combination of sequence of RAN Parameter tests<br><br>RAN Imperative Policy = Sequence of RAN parameters used to enhance RAN admission algorithm<br><br>Negative outcome results in EN-DC SgNB Addition Rejection message sent to eNB and incoming message dropped. |

FIG. 14

ADDING PER-USER EQUIPMENT CONTROLS TO RADIO INTELLIGENT CONTROLLER E2 POLICY

CROSS-REFERENCE TO RELATED APPLICATIONS:

This application claims priority from U.S. provisional patent application No. 62/986,403 filed on Mar. 6, 2020. The contents of this earlier filed application are hereby incorporated by reference in their entirety.

FIELD:

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for adding per-user equipment controls to radio intelligent controller E2 policies.

BACKGROUND:

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY:

Some example embodiments are directed to a method. The method may include receiving, at a network node supporting one or more E2 polices, a subscription procedure comprising an event trigger. The method may also include detecting the event trigger for a user equipment. The method may further include determining whether the user equipment is a member of a user equipment list. In addition, the method may include executing an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Other example embodiments may be directed to an apparatus. The apparatus may include at least one processor and at least one memory including computer program code. The at least one memory and computer program code may also be configured to, with the at least one processor, cause the apparatus at least to receive, at the apparatus supporting one or more E2 polices, a subscription procedure comprising an event trigger. The apparatus may also be caused to detect the event trigger for a user equipment. The apparatus may further be caused to determine whether the user equipment is a member of a user equipment list. In addition, the apparatus may be caused to execute an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Other example embodiments may be directed to an apparatus. The apparatus may include means for receiving, at the apparatus supporting one or more E2 polices, a subscription procedure comprising an event trigger. The apparatus may also include means for detecting the event trigger for a user equipment. The apparatus may further include means for determining whether the user equipment is a member of a user equipment list. In addition, the apparatus may include means for executing an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

In accordance with other example embodiments, a non-transitory computer readable medium may be encoded with instructions that may, when executed in hardware, perform a method. The method may include receiving, at a network node supporting one or more E2 polices, a subscription procedure comprising an event trigger. The method may also include detecting the event trigger for a user equipment. The method may further include determining whether the user equipment is a member of a user equipment list. In addition, the method may include executing an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Other example embodiments may be directed to a computer program product that performs a method. The method may include receiving, at a network node supporting one or more E2 polices, a subscription procedure comprising an event trigger. The method may also include detecting the event trigger for a user equipment. The method may further include determining whether the user equipment is a member of a user equipment list. In addition, the method may include executing an ongoing process based on the detection and whether the user equipment is a member of the user equipment list. In addition, the method may include executing an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Other example embodiments may be directed to an apparatus that may include circuitry configured to receive, at the apparatus supporting one or more E2 polices, a subscription procedure comprising an event trigger. The apparatus may also include circuitry configured to detect the event trigger for a user equipment. The apparatus may further include circuitry configured to determine whether the user equipment is a member of a user equipment list. In addition, the apparatus includes circuitry configured to execute an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Certain example embodiments may be directed to a method. The method may include transmitting, from a radio access network intelligent controller to a network node, a subscription procedure comprising an event trigger and one or more E2 policies referring to a radio access network user equipment group. The method may also include transmitting an E2 control message to the network node to explicitly add or remove a given user equipment from a user equipment list. The method may further include receiving an incoming message from the network node in response to the subscription procedure and E2 control message. In addition, the method may include performing, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Other example embodiments may be directed to an apparatus. The apparatus may include at least one processor and at least one memory including computer program code. The at least one memory and computer program code may be configured to, with the at least one processor, cause the apparatus at least to transmit, from the apparatus to a network node, a subscription procedure comprising an event trigger and one or more E2 policies referring to a radio access network user equipment group. The apparatus may also be caused to transmit an E2 control message to the network node to explicitly add or remove a given user equipment from a user equipment list. The apparatus may further be caused to receive an incoming message from the network node in response to the subscription procedure and E2 control message. In addition, the apparatus may be caused to perform, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Other example embodiments may be directed to an apparatus. The apparatus may include means for transmitting, from the apparatus, a subscription procedure comprising an event trigger and one or more E2 policies referring to a radio access network user equipment group. The apparatus may also include means for transmitting an E2 control message to the network node to explicitly add or remove a given user equipment from a user equipment list. The apparatus may further include means for receiving an incoming message from the network node in response to the subscription procedure and E2 control message. In addition, the apparatus may include means for performing, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

In accordance with other example embodiments, a non-transitory computer readable medium may be encoded with instructions that may, when executed in hardware, perform a method. The method may include transmitting, from a radio access network intelligent controller to a network node, a subscription procedure comprising an event trigger and one or more E2 policies referring to a radio access network user equipment group. The method may also include transmitting an E2 control message to the network node to explicitly add or remove a given user equipment from a user equipment list. The method may further include receiving an incoming message from the network node in response to the subscription procedure and E2 control message. In addition, the method may include performing, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Other example embodiments may be directed to a computer program product that performs a method. The method may include transmitting, from a radio access network intelligent controller to a network node, a subscription procedure comprising an event trigger and one or more E2 policies referring to a radio access network user equipment group. The method may also include transmitting an E2 control message to the network node to explicitly add or remove a given user equipment from a user equipment list. The method may further include receiving an incoming message from the network node in response to the subscription procedure and E2 control message. In addition, the method may include performing, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Other example embodiments may be directed to an apparatus that may include circuitry configured to transmit, from the apparatus to a network node, a subscription procedure comprising an event trigger and one or more E2 policies referring to a radio access network user equipment group. The apparatus may also include circuitry configured to transmit an E2 control message to the network node to explicitly add or remove a given user equipment from a user equipment list. The apparatus may further include circuitry configured to receive an incoming message from the network node in response to the subscription procedure and E2 control message. In addition, the apparatus may include circuitry configured to perform, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

BRIEF DESCRIPTION OF THE DRAWINGS:

For proper understanding of example embodiments, reference should be made to the accompanying drawings, wherein:

FIG. 3 illustrates an example of attributes of a scope identifier in certain policies.

FIG. 4 illustrates an example of attributes of a traffic steering preference statement.

FIG. 5 illustrates an example of allowed combinations of scope identifiers and policy statements.

FIG. 8(*b*) illustrates another example of RIC services corresponding to a CONTROL service.

FIG. 10 illustrates an example information element (IE) that defines a generic radio access network (RAN) user equipment (UE) group definition.

FIG. 11 illustrates an example IE that defines a RAN UE Group ID IE.

FIG. 12 illustrates an example IE that defines another generic RAN UE Group definition IE.

FIG. 13 illustrates an example IE that defines a generic RAN imperative policy IE.

FIG. 14 illustrates an example message admission policy handling.

FIG. 20(*b*) illustrates another apparatus, according to an example embodiment.

DETAILED DESCRIPTION:

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for adding per-user equipment controls to radio intelligent controller E2 policies.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Figure 1:
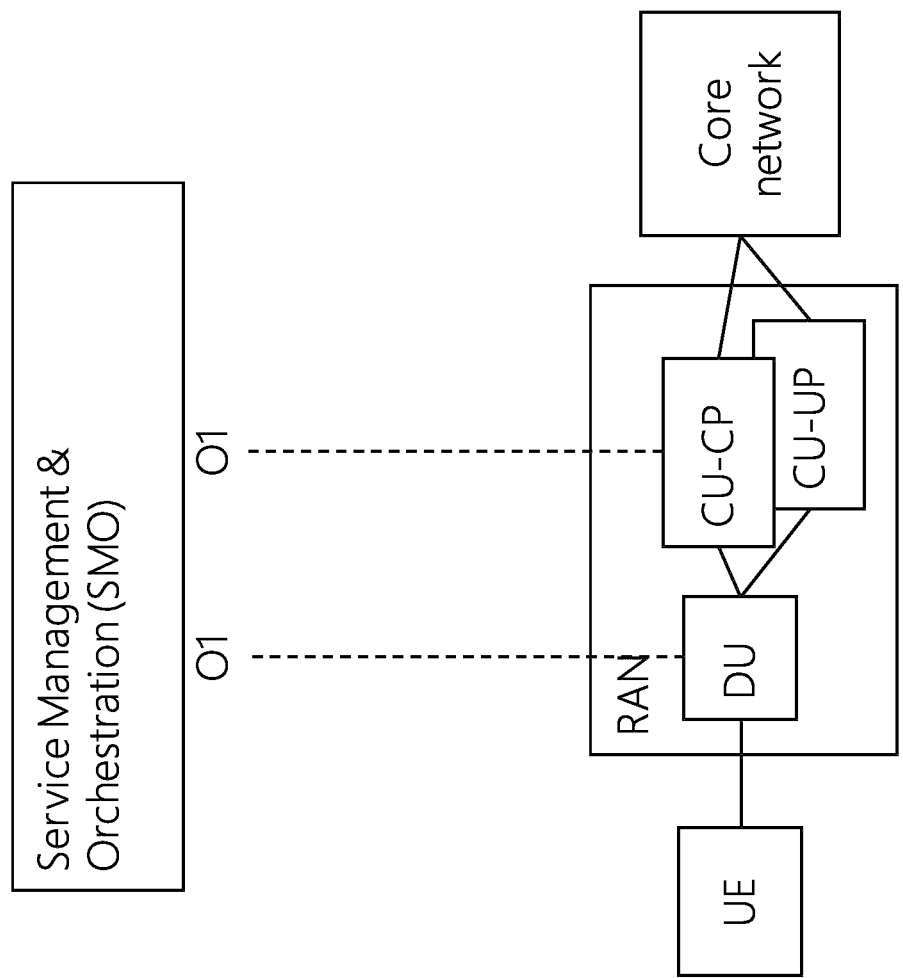
FIG. 1 illustrates an example of a mobile architecture.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof FIG. 1 illustrates an example of a mobile architecture. As illustrated in FIG. 1, mobile networks such as 2G Global System for Mobile Communications (GSM), 3G Wideband Code Division Multiple Access (WCDMA), 4G LTE, and 5G NR networks defined in $3^{rd}$ Generation Partnership Project (3GPP) may include a user equipment (UE), base stations, and other equipment within a Radio Access Network (RAN), core network subsystem, and a Service Management and Orchestration (SMO) system. Further, an E1 interface may be included between the centralized unit-control plane (CU-CP) and the centralized unit-user plane (CU-UP), as defined in 3GPP.

Figure 2:
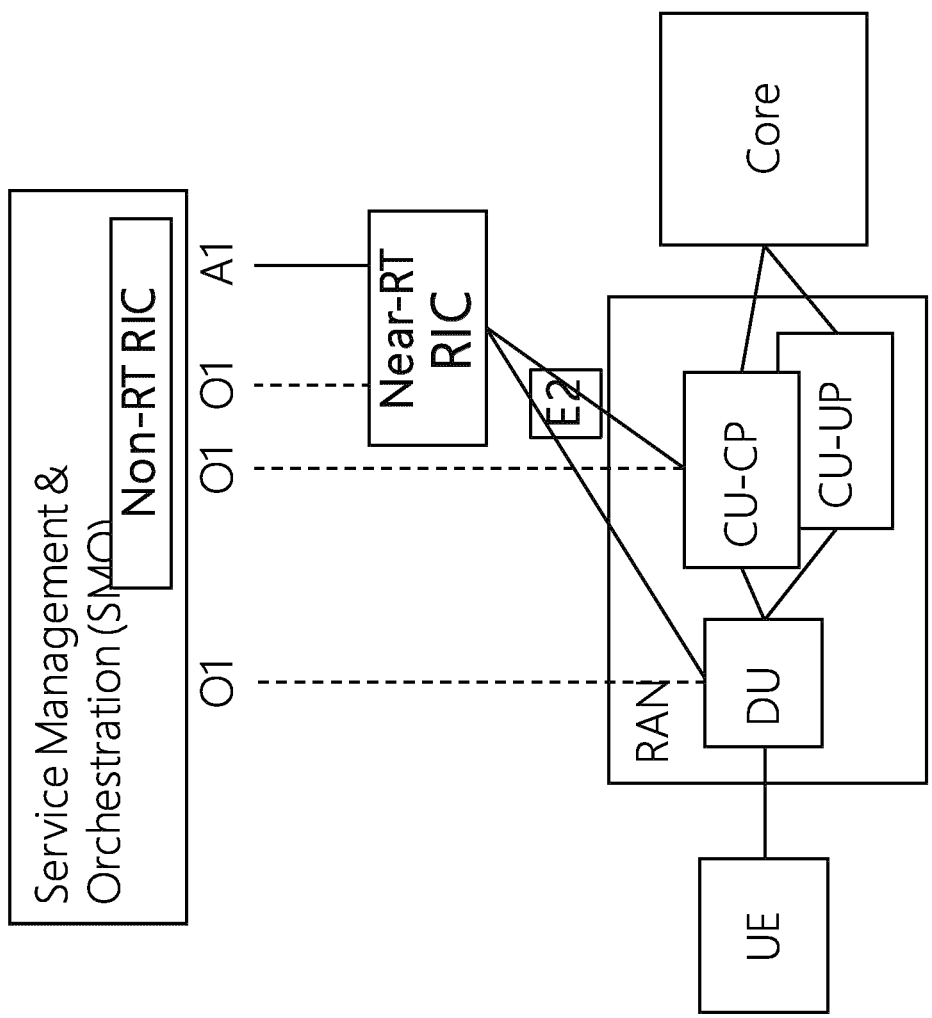
FIG. 2 illustrates an example of an open radio access network (O-RAN) architecture.

FIG. 2 illustrates an example of an open radio access network (O-RAN) architecture. As illustrated in FIG. 2, O-RAN Alliance architecture introduces a number of significant extensions to 3GPP defined mobile networks. Further, harmonization of network management interfaces with the definition of a set of O1 interfaces may be used to carry configuration management (CM), performance management (PM), and fault management (FM) information. In addition, extension of the SMO layer with the addition of a new "Non-Realtime RAN Intelligent Controller" (non-RT RIC) may provide a new O-RAN defined A1 interface. The addition of new network function "Near-Realtime (RT) RAN Intelligent Controller" (near-RT RIC) may be charged with terminating the A1 interface from the SMO layer, and providing the new O-RAN defined E2 interface towards the RAN. As illustrated in FIG. 2, the O-RAN defined E2 interface may provide a means for interconnecting a near-RT RIC and an E2 node. The E2 application protocol (E2AP) may support the functions of the E2 interface by signaling procedures defined in O-RAN. As illustrated in FIG. 2, there may be a single E2 interface on CU-CP for the entire RAN, or there may be individual E2 interfaces on each RAN component. FIG. 2 also illustrates that the one or more RAN components may be known as an E2 node. In addition, extension of RAN components such as, for example, CU-CP, CU-UP, and distributed unit (DU) to provide services to the new E2 interface. Furthermore, the near-RT RIC may be deployed in a mobile network as either a standalone network function, or may be deployed co-located with the one or more RAN components as an integrated solution, for example, as a combined near-RTRIC and CU-CP.

O-RAN defines an A1 interface and specifies a solution for traffic steering related A1 policy. The solution may be expressed in terms of a scope statement and a policy statement, and a corresponding set of "allowed combinations." FIG. 3 illustrates an example of attributes of a scope identifier in certain policies. For instance, A1 policies may be defined as containing a scope identifier, and one or more policy statements where policy statements contain policy objectives and/or policy resources. This section defines the structured data type and the attributes to be used as the scope identifier. As illustrated in FIG. 3, the condition "C" means that at least one attribute shall be included when the scope is defined. Further, the allowed combinations of attributes may depend on the policy statement that is combined with the scope identifier.

FIG. 4 illustrates an example of attributes of a traffic steering preference statement. In particular, FIG. 4 illustrates example attributes of a traffic steering preference. As illustrated in FIG. 4, the presence of condition "M" means that the attribute shall be included when this statement is sued while "0" means that it is optional to include.

FIG. 5 illustrates an example of allowed combinations of scope identifiers and policy statements. In particular, FIG. 5 illustrates certain allowed combinations between a policy statement and scope identifiers containing different combinations of identifiers. However, not all combinations may be relevant. As illustrated in FIG. 5, on each row is listed a combination of identifiers that is allowed for the indicated statement. The notation is the same as for cardinality, where "0" means the identifier shall not occur, "0.1" means that the identifier may occur, and "1" means that the identifier shall occur. In FIG. 5, at most one occurrence of an identifier may be allowed in this version. Further, this A1 policy for traffic steering may effectively be an ordered list of cell sot be applied to a specific A1 "scope" (UE_ID, Group_ID, Slice_ID, QoS_ID, and Cell_ID) may be subject to the list of corresponding to allowed combinations. The allowed combinations may include cases of specific UE, specific slice, etc.

O-RAN also defines a new E2 interface between RIC (RAN Intelligent Controller) and radio access network (RAN). This interface may support report, policy, insert, and control services.

Further, near-RT RIC (Near-Real Time RIC) related services may be provided over the E2 interface, and may be classified into four classes: REPORT (RAN>RIC): RAN configured to REPORT to RIC information obtained by a specified trigger event; INSERT (RAN>RIC): RAN configured to suspend the normally autonomous process during a specified trigger event, and forward the state to RIC for subsequent processing; CONTROL (RIC>RAN): RIC may send a CONTROL message to initiate a process in RAN from a specialized state (i.e., for a specified UE within a particular group of UE, and may be used as either response to INSERT or autonomously; POLICY (RIC>RAN): RAN configured to modify normal RAN response to a specified trigger event within a specified procedure according to a specific POLICY.

Figure 6:
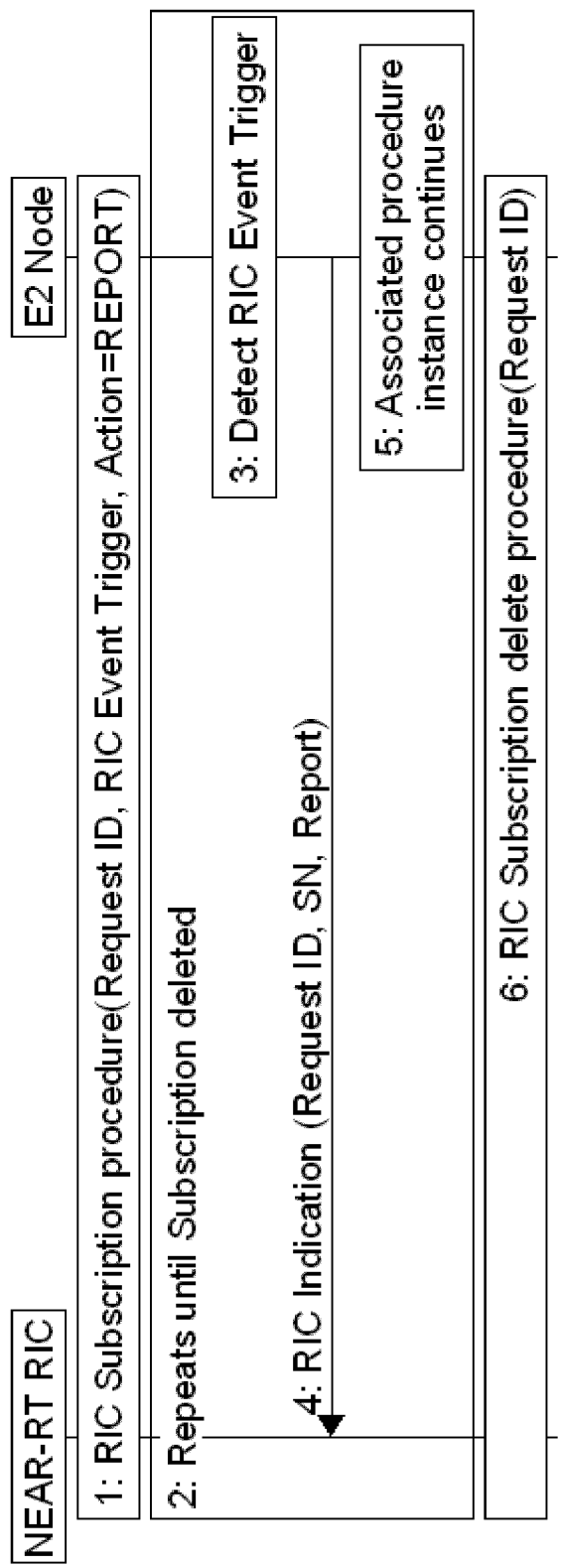
FIG. 6 illustrates an example of RIC (RAN Intelligent Controller) services corresponding to a REPORT service.

FIG. 6 illustrates an example of RIC services corresponding to a REPORT service. For instance, FIG. 6 illustrates an RIC subscription procedure, where after each occurrence of a defined RIC event trigger, the E2 node may send a REPORT message to the near-RT RIC, and the associated procedure may continue in the E2 node For instance, FIG. 6 illustrates at 1, an RIC subscription procedure between the near-RT RIC and the E2 node. After each occurrence of a defined RIC event trigger, E2 nodes may send a REPORT message to near-RT RIC and the associated procedure may continue in the E2 node. At 2, the RIC subscription procedure may continue and repeat until the subscription is deleted. At 3, the E2 node may detect an RIC event trigger, after which at 4, the E2 node may send the near-RT RIC an RIC indication including the request ID, SN, and report. Further, at 5, the E2 node may continue the associated procedure instance. Additionally, at 6, an RIC subscription delete procedure is performed between the near-RT RIC and the E2 node.

Figure 7:
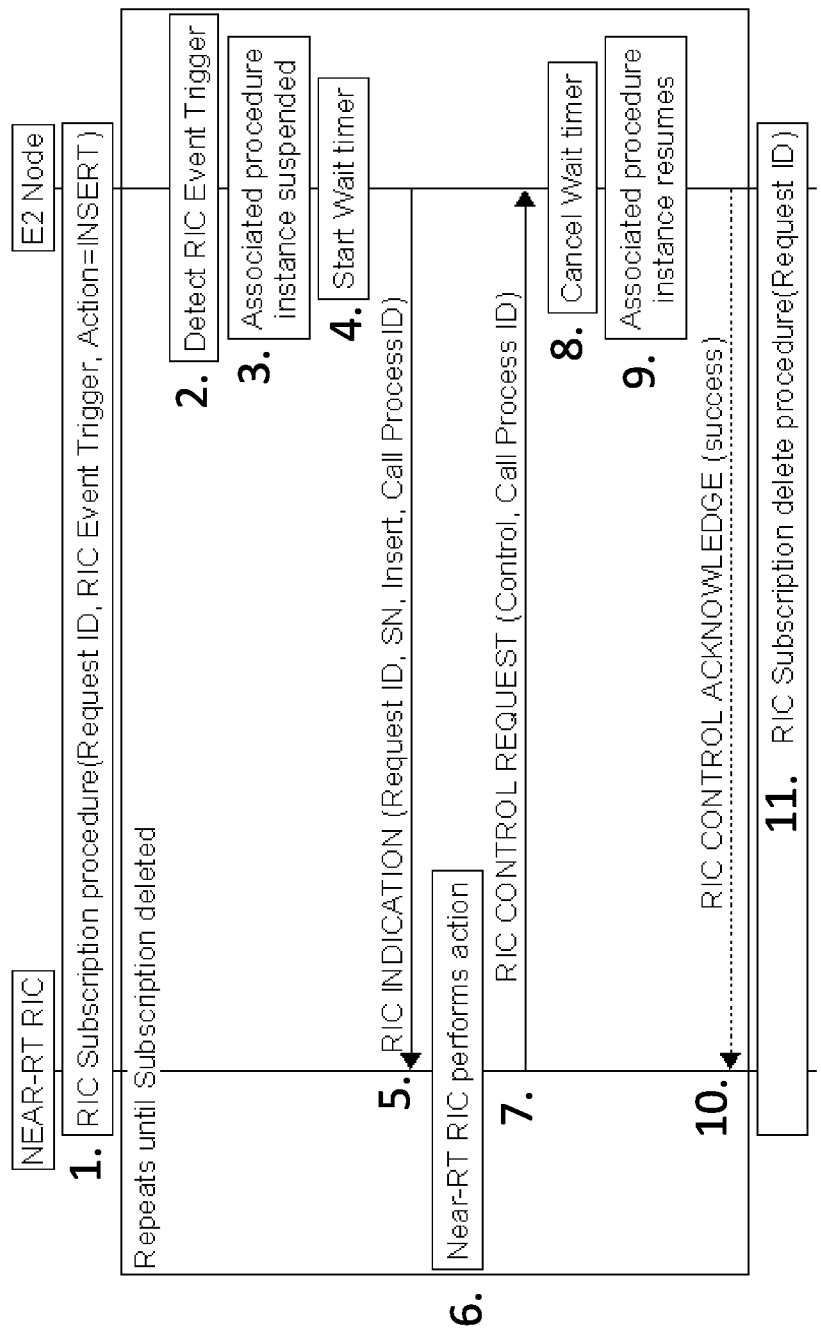
FIG. 7 illustrates an example of RIC services corresponding to an INSERT service.

FIG. 7 illustrates an example of RIC services corresponding to an INSERT service. For instance, FIG. 7 illustrates that following RIC subscription, after each occurrence of a defined RIC event trigger such as the arrival of an incoming message on an interface, the E2 node may send an INSERT message to the RIC and suspend the associated procedure in the E2 node. At 1 in FIG. 7, an RIC subscription procedure may be conducted between the near-RT RIC and the E2 node. At 2, the E2 node may detect an RIC event trigger, and at 3, the E2 node may suspend the associated procedure instance. Further, at 4, the E2 node may start a wait timer, and at 5, may provide a RIC indication to the near-RT RIC. The near-RT RIC may then at 6, perform an action such as make a decision to recommend that the E2 Node should accept or reject the incoming message, and at 7, may send an RIC control request to the E2 node. Upon receipt of the RIC control request, at 8, the E2 node may cancel the wait timer, and at 9, resume the associated procedure instance such as to either accept or reject the original incoming message that was previously sent to the near-RT RIC at the occurrence of the defined RIC event trigger. In addition, at 10, the E2 node may send a RIC control acknowledgment to the near-RT RIC, and at 11, a RIC subscription delete procedure may be initiated between the near-RT RIC and the E2 node.

Figure 8A:
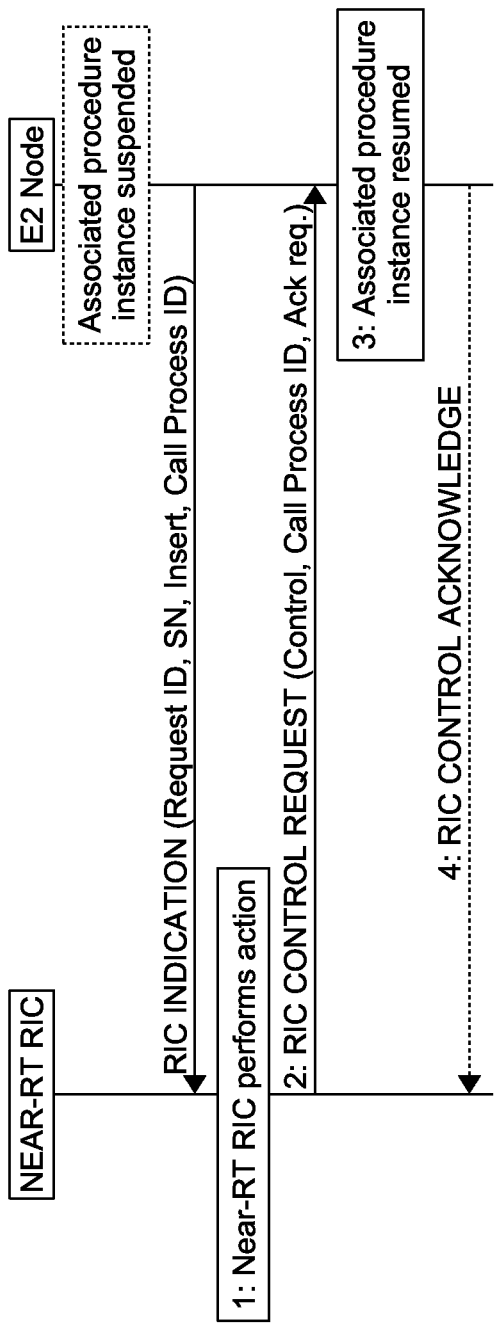
FIG. 8(*a*) illustrates an example of RIC services corresponding to a CONTROL service.
Figure 8B:
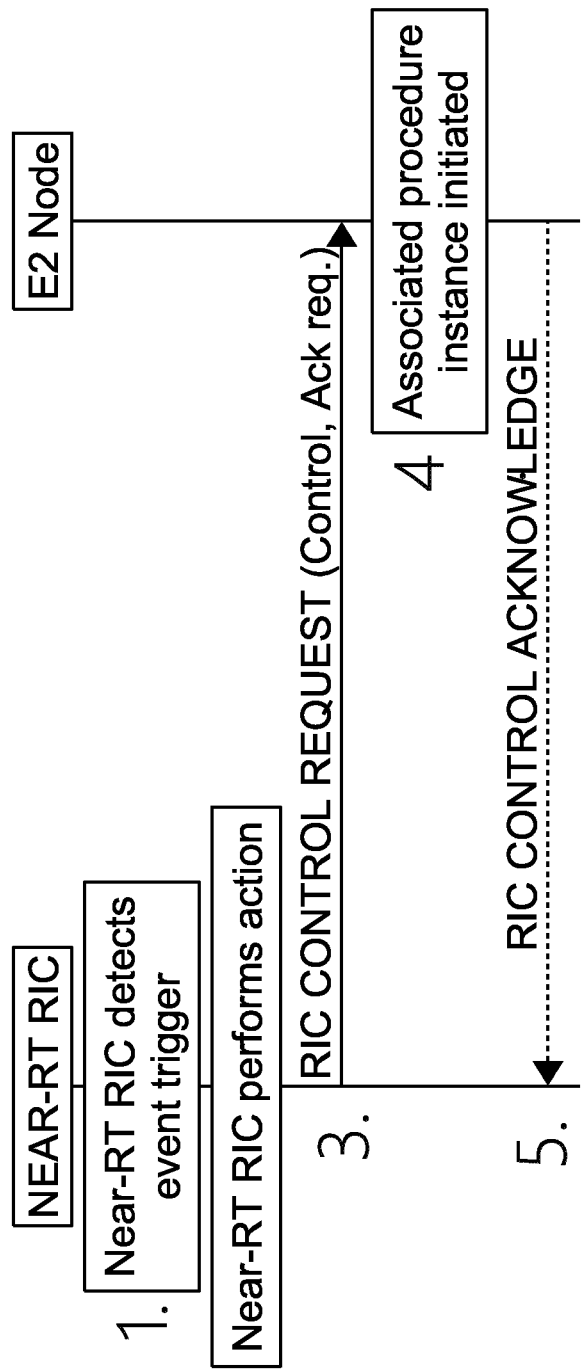

FIG. 8(*a*) illustrates an example of RIC services corresponding to a CONTROL service. In particular, FIG. 8(*a*) illustrates a CONTROL service in response to the INSERT service. Similar to FIG. 7, at 1, the near-RT RIC may perform an action such as make a decision to recommend that the E2 Node should accept or reject the incoming message. At 2, the near-RT RIC may send a RIC control request to the E2 node. Further, at 3, the E2 node may resume the associated procedure instance, and at 4, may send a RIC control acknowledgment message to the near-RT RIC.

FIG. 8(*b*) illustrates another example of RIC services corresponding to a CONTROL service. In particular, FIG. 8(*b*) illustrates a CONTROL service related to RIC internal initiation. For instance, as illustrated in FIG. 8(*b*), at 1, the near-RT RIC may detect an event trigger. Then, at 2, the near-RT RIC may perform an action such as make a decision to recommend that the E2 Node should initiate a new control plane mechanism, and at 3, send a RIC control request to the E2 node. At 4, the E2 node may initiate the associated procedure instance, and at 5 may send a RIC control acknowledge message.

Figure 9:
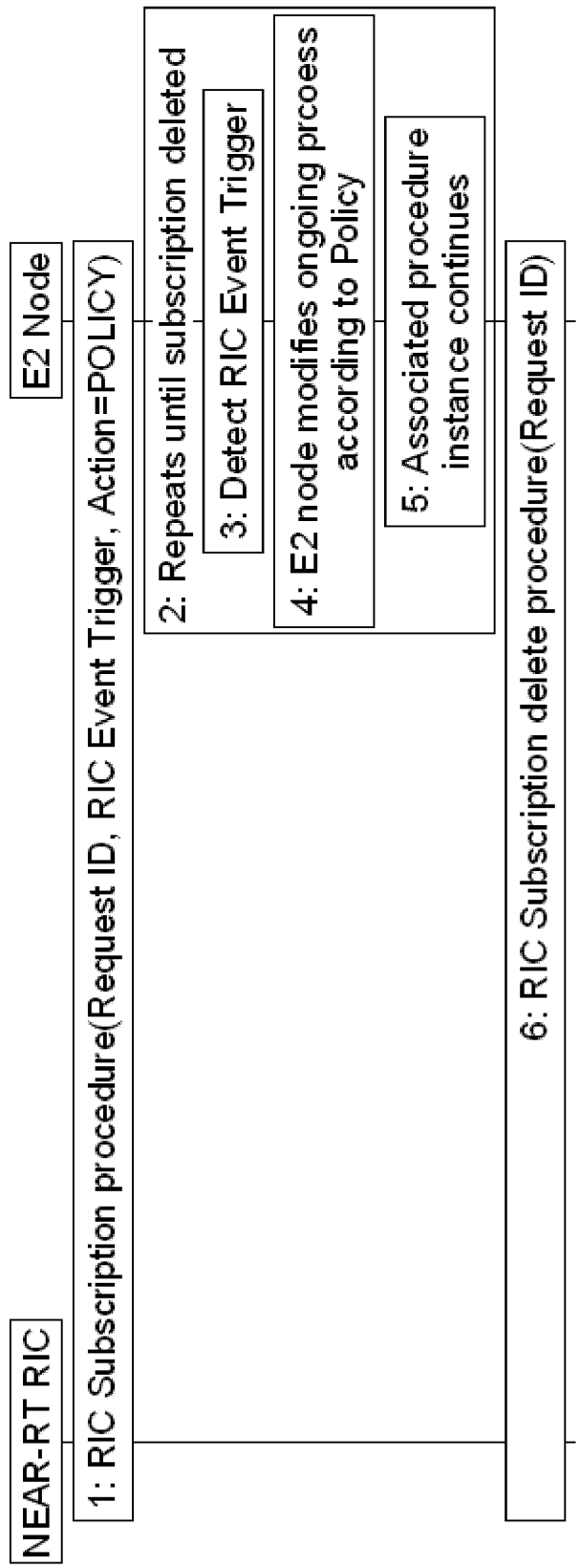
FIG. 9 illustrates an example signal flow diagram for an E2 policy.

FIG. 9 illustrates an example of RIC services corresponding to a POLICY service. For instance, FIG. 9 illustrates an RIC subscription procedure, where after each occurrence of a defined RIC event trigger, the E2 node may modify an ongoing associated process according to the policy defined by the near-RT RIC in the RIC subscription procedure, and the associated procedure may continue in the E2 node. FIG. 9 illustrates at 1, an RIC subscription procedure between the near-RT RIC and the E2 node. At 3, the E2 node may detect an RIC event trigger, after which at 4, the E2 node may modify an ongoing associated process according to the received Policy. Further at 5, the associated procedure may continue in the E2 node. At 2, the RIC subscription procedure may continue and repeat until the subscription is deleted. Additionally, at 6, an RIC subscription delete procedure is performed between the near-RT RIC and the E2 node.

Furthermore, the various RIC services may be used in combination. FIG. 7 illustrates how the RIC Insert service is combined with a subsequent RIC control service, that is a E2 Insert/Control service. Other examples include the combination of a RIC Report service with a subsequent RIC Policy service and the combination of an RIC Report Service with a RIC Control service, that is a E2 Report/Control mechanism.

In all of these cases, the detailed definitions of RIC Services may be defined in dedicated E2 Service Model (E2SM) that defines how the generic RIC Services are to be applied to a particular functionality in the RAN, referred to as a "RAN Function".

In addition, the E2 policy service may be used to modify RAN behavior so that a parametric defined RAN user equipment (UE) group may be subjected to a specific variation to a baseline OAM defined behavior. For example, a RAN UE Group defined in terms of any UE with a specific single network slice selection assistance information (S-NSSAI), quality of service (QoS) flow identifier (QFI), and allocation and retention policy (ARP) may have a different call admission threshold applied compared to a default behavior (i.e., admit if cell load is less than a baseline of 70% plus additional 5%=75% for this RAN UE Group).

The E2 policy solution described in the O-RAN may be flexible and may be applied to a wide range of use cases impacting both RAN control and user plane behavior. In addition, the E2 policy as defined in O-RAN does, however, have a disadvantage of not supporting explicit nomination of a specific UE, which is required to support the O-RAN defined A1 policy for traffic steering and other use cases. For these use cases, the current working assumption in O-RAN is that per-UE handling over E2 would use the alternative of using E2 insert/control or E2 report/control based mechanism. However, the disadvantage of this approach is that it implies the split of the radio resource management (RMM) control plane between the centralized unit (CU) and control part (CP) (CU-CP) and RIC with the E2 interface used to force the RAN to execute a particular radio resource management (RRM) mechanism. Thus, according to certain example embodiments, a mechanism may be provided where per-UE commands may be defined over the E2 interface that are used to modify the scope of an active E2 policy, and to avoid directly forcing the RAN to execute a particular RRM mechanism.

In some examples, certain policies may include a policy service style that uses RIC action definition "Information Element" (IE) format where the RAN UE Group is described in terms of a list of test conditions using RAN parameters. For instance, a given UE may be considered to be assigned to a specific RAN UE Group when all test conditions are met. The RAN UE Group ID may equal 0 for a default case, and may be applied to any UE that is not assigned to any other RAN UE Group. Further, the E2 policy may be encoded in terms of a list of specific RAN parameters, and may be applied to any UE within a given RAN UE Group. The default UE policy corresponding to the default behavior of the RAN function without an active imperative E2 policy, may be used for UE assigned to RAN UE Group ID=0.

According to certain examples, the action definition information contained in the E2 Subscription message may support a policy encoded as a list of RAN UE Groups, each with a group identifier, group definition described in terms of a list of RAN parameters with test conditions and a command described in terms of a list of RAN parameters. For instance, FIG. 10 illustrates the Action definition IE specified in the O-RAN defined E2SM-NI specification that defines a generic E2 Policy definition. Further, FIG. 11 illustrates an example IE that defines RAN UE Group ID IE, and FIG. 12 illustrates an example IE that defines the generic RAN UE Group definition IE. Additionally, FIG. 13 illustrates an example IE that defines a generic RAN imperative policy IE, and FIG. 14 illustrates an example message admission policy handling.

In certain examples, the traffic steering RAN function may perform various functions. One function may include handover of a UE, where the UE is identified with a specific ID between its serving cell and a target cell. This functionality may be intended to support three different handover types including, for example, Intra-CU/Intra, intra-CU/Inter-distributed unit (DU), and Inter-CU. Further, another function may include addition of a secondary gNodeB for the UE in order to activate dual DC (applicable to EPC connected deployment). This defines not only the gNodeB to assign to the UE as an SgNodeB, but also the specific target cell from among the cells controlled by the SgNodeB.

For FIGS. 10-14, examples of suitable RAN parameter tests may be for matches of service profile identifier (SPID), QoS class identifier (QCI), and ARP information elements in the incoming secondary gNB (SgNB). For instance, a given RAN UE Group may be defined as any UE with SPID=x, QCI=y, and ARP=z. Further, an example of the RAN parameters for the RAN imperative policy may include an offset for the call admission threshold. For example, a given RAN UE Group may have a call admission threshold set to the sum of the baseline value set by an operations, administration and maintenance (OAM) [70%] plus an offset [+5%] and, thus, any UE in this RAN UE Group may be admitted for loads up to [75%], while any UE in the default group would be admitted for cell loads up to [70%].

Figure 15:
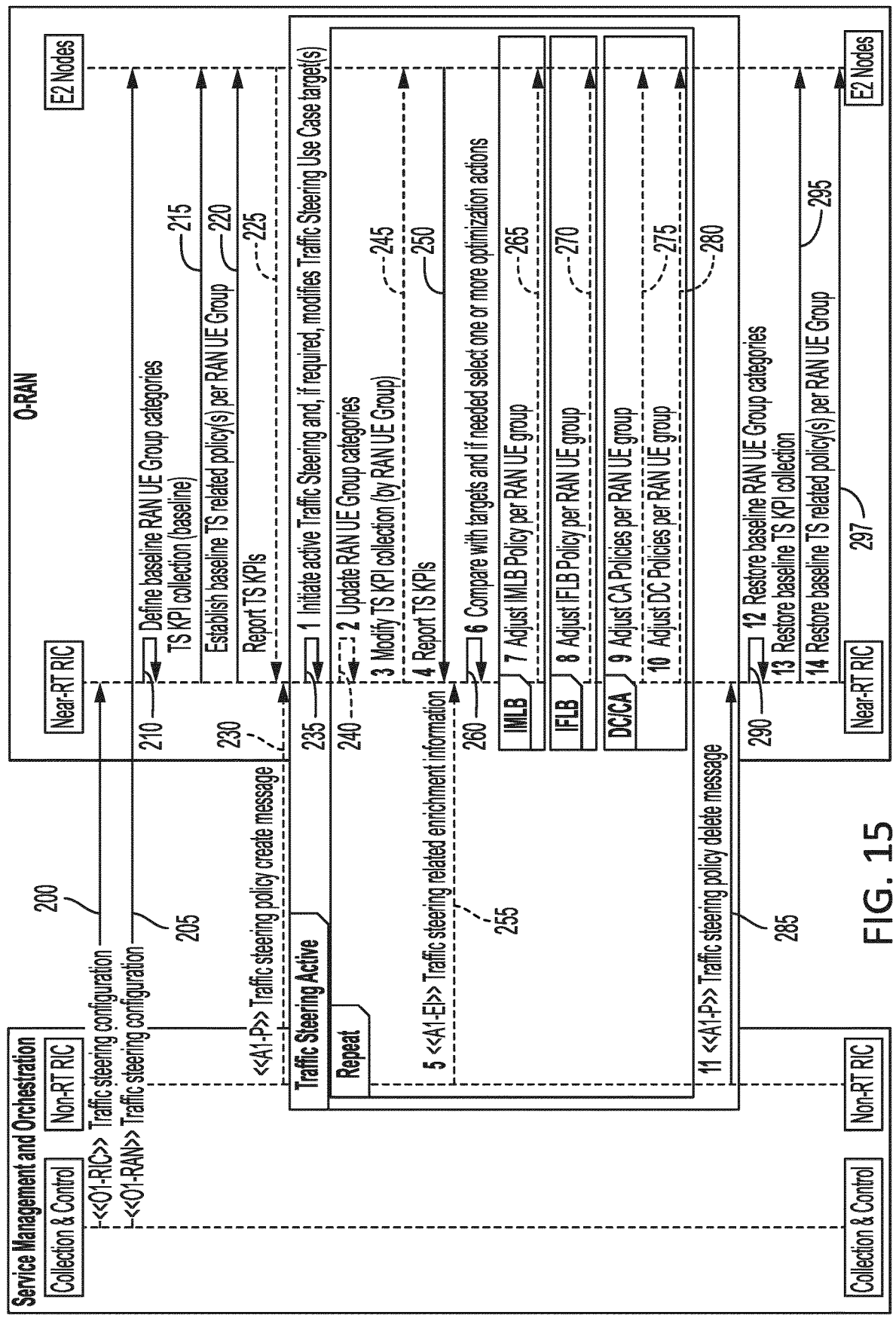
FIG. 15 illustrates another example signal flow diagram of an E2 interface mechanism.

FIG. 15 illustrates another example signal flow diagram of an E2 interface mechanism, in this case for the "Traffic Steering" (TS) use case. In particular, FIG. 15 illustrates an E2 interface mechanism that is part of a call flow. As illustrated in FIG. 15, at 200, the collection and control function of the service management and orchestration (SMO) system may send a traffic steering configuration to a near-RT RIC at the O-RAN. At 205, the collection and control function may send the traffic steering configuration to E2 nodes at the O-RAN. At 210, the near-RT RIC may define baseline RAN UE Group categories. In addition, at 215, the near-RT RIC may send a "Traffic Steering" (TS) key performance indicator (KPI) collection (baseline) to the E2 nodes. At 220, the near-RT RIC may establish a baseline TS related policy(s) per RAN UE Group with the E2 nodes.

As further illustrated in FIG. 15, at 225, the E2 nodes may report the TS KPIs to the near-RT RIC, and at 230, the non-RT RIC at the service management and orchestration system may send a traffic steering policy create message to the near-RT RIC. Further, at 235, the near-RT RIC may initiate active traffic steering and, if required, modify traffic steering use case target(s). At 240, the near-RT RIC may update RAN UE Group categories, and at 245, the near-RT RIC may modify TS KPI collection (by RAN UE Group). Then, at 250, the E2 nodes may report TS KPIs to the near-RT RIC, and at 255, the non-RT RIC may send traffic steering related enrichment information to the near-RT RIC. At 260, the near-RT RIC may compare the received traffic steering related enrichment information with the targets, and if needed, select one or more optimization actions.

Additionally, as illustrated in FIG. 15, at 265, the near-RT RIC may adjust an idle mode load balancing (IMLB) policy per RAN UE Group. Further, at 270, the near-RT RIC may adjust an inter-frequency load balancing (IFLB) policy per RAN UE Group. In addition, at 275, the near-RT RIC may adjust carrier aggregation (CA) policies per RAN UE group, at 280, the near-RT RIC may adjust dual connectivity (DC) policies per RAN UE Group. At 285, the non-RT RIC may send a traffic steering policy delete message to the near-RT RIC. At 290, the near-RT RIC may restore baseline RAN UE Group categories after receiving the traffic steering policy delete message. At 295, the near-RT RIC may restore baseline TS KPI collection, and at 297, restore baseline TS related policy(s) per RAN UE Group.

Figure 16:
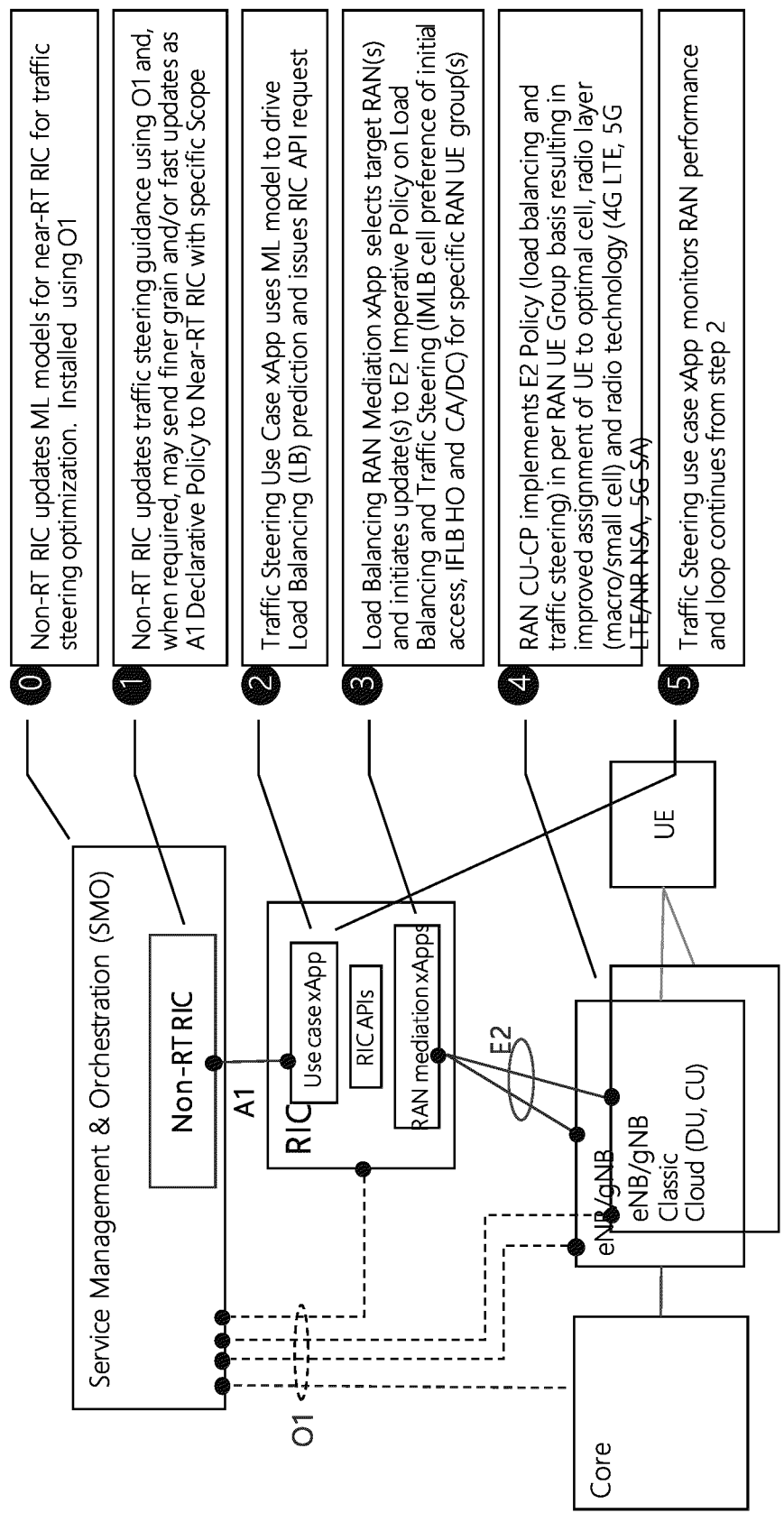
FIG. 16 illustrates an end-to-end view of traffic steering, according to an example embodiment.

FIG. 16 illustrates an end-to-end view of traffic steering, according to an example embodiment. As illustrated in FIG. 16, at 0, the non-RT RIC may update machine learning (ML) models for near-RT RIC for traffic steering optimization. In an example embodiment, this may be installed using O1. At 1, the non-RT RIC may update traffic steering guidance using O1 and, when required, may send finer grain and/or more frequent updates as A1 Declarative Policy to near-RT RIC with specific scope. Further, at 2, traffic steering use case xApp may use the ML model to drive load balancing (LB) prediction and issue RIC API request. In addition, at 3, LB RAN mediation xApp may select one or more target RANs and may initiate one or more updates to one or more E2 imperative policies on LB and traffic steering (IMLB cell preference of initial access, IFLB HO and CA/DC) for specific RAN UE group(s). At 4, the RAN CU-CP may implement E2 policy (LB and traffic steering) in a per RAN UE group basis resulting in improved assignment of the UE to optimal cell, radio layer (macro/small cell), and radio technology (e.g., 4G LTE, 5G LTE/NR NSA, 5G SA). Further, at 5, traffic steering use case xApp continue to may monitor RAN performance, and the loop may continue from step 2. According to certain example embodiments, the xApp may identify that a particular UE should be made an explicit member of a particular UE group.

The RAN function may also change the serving SgNB for a particular UE that is currently configured to use DC services. In addition, the RAN function may release the SgNB for a particular UE that is currently configured to use DC services. Further, the RAN function may change the master eNodeB for a particular UE is currently configured to use DC services, while maintaining the same SgNB.

The 3$^{rd}$ Generation Partnership Project (3GPP) has defined in the RAN mechanism for an initial attachment, bearer management, handover, CA, and DC for 4G and 5G mobile networks. These may collectively be referred to as RRM mechanisms, and many may be implemented in the RAN CU-CP network function. Further, O-RAN A1 interface defines the mechanism where a non-RT RIC may create policies and send them to the near-RT RIC setting requirements for the near-RT RIC to enforce these policies with scope assigned to a specific ell, slice, QoS, and/or UE. Further, the O-RAN E2 interface defines the mechanism where the near-RT RIC may use the E2 report, insert, control and policy services to influence the RAN RRM mechanisms. In addition, O-RAN contributions propose how the traffic steering use case may use either E2 policy or RAN UE Groups, or E2 control for individual UEs.

Certain example embodiments may provide an extension to the O-RAN defined E2 policy mechanism where a RAN UE Group definition may also include an explicit list of nominated UEs, which may be based on a corresponding list of nominated UEs in the A1 Policy message, or based on an RIC internal selection of target UEs. For example, in certain example embodiments, the RIC may send an E2 policy message referring to a certain RAN UE Group (i.e., group 10), and then may send one or more E2 control messages to explicitly add or remove a given UE from the list. Thus, certain example embodiments may add an explicit UE list as a new information element in RAN UE Group definition, as illustrated in FIG. 12. According to certain example embodiments, this may either be done explicitly, as a new IE, or implicitly, via the nomination of an explicit UE list as a defined RAN parameter in the existing list. In certain example embodiments, a new usage of the RIC Control service may be added to a corresponding E2 Service Model (E2SM) to define the encoding of the add and delete commands to dynamically modify the current list of UE assigned to an explicit UE list.

In certain example embodiments, a RAN with an E2 interface to a near-RT RIC may support one or more E2 policy services that are used to modify the default RAN behavior defined using an OAM configuration. In particular, according to one example embodiment, the E2 policy may include a scope part defined as a RAN UE Group, and an action part defined in terms of a set of RAN parameters that are used to modify the default RAN behavior. According to an example embodiment, the RAN UE Group definition may include a list of parameters such as network slice identifier (S-NSSAI), SPID parameter and QoS parameters such as QCI/QFI and ARP that are used to configure a matching procedure used to place a given UE into a specific RAN UE Group. In certain example embodiments, these parameters may refer to information concerning the UE obtained from one or more network interface messages (including, but not limited to, 3GPP defined interfaces X2, Xn, S1, NG), for example, a SgNB may obtain QCI, ARP and SPID identifiers for a particular UE in an incoming SgNB Addition Request message. The parameters may also refer to measurements performed by the UE or the RAN such as average received signal strength. In one example embodiment, the RAN UE Group definition may also include a list of explicitly nominated UEs using one or more identifiers known to the RAN node.

According to an example embodiment, with the E2 policy, the explicit list of UEs may be established as part of the E2 RIC subscription request message. In addition, the E2 RIC SUBSCRIPTION REQUEST message may be used to establish the E2 policy in the RAN. According to another example embodiment, with the E2 policy, the explicit list of the UEs may be established and/or modified as part of a subsequent E2 CONTROL REQUEST message that is used to either add or delete one or more UEs from the list of UEs associated with a specific RAN UE Group defined in the E2 policy. In another example embodiment, with the E2 policy and an explicit list of UEs associated with a RAN UE Group using the mechanisms described above (e.g., mechanisms related to the E2 RIC SUBSCRIPTION REQUEST message and the E2 CONTROL REQUEST message), the RAN UE Group and the associated explicit list of UEs may be maintained when and if the E2 policy is modified using a subsequent E2 RIC subscription request. In an example embodiment, with an E2 RIC SUBSCRIPTION REQUEST, the request to maintain a previously established explicit list of UEs associated with a RAN UE Group may be signaled to the RAN using the same RAN UE Group identifier in the subsequent RIC subscription request.

In addition, an E2 RIC SUBSCRIPTION REQUEST may be signaled with an explicit indication in the message to maintain the previously defined RAN UE Group which may include reference to a previously established explicit list of UEs. In another example embodiment, an E2 RIC SUBSCRIPTION REQUEST, where the request to maintain a previously established explicit list of UEs associated with a RAN UE Group as described above, may be signaled to the RAN. According to an example embodiment, this may be signaled using an explicit indication that a member of an explicit UE list associated with a previous RAN UE Group identifier in a previous E2 policy is to be used as an initial explicit UE list associated with a RAN UE Group in a subsequent RIC subscription request. In a further example embodiment, the encoding of the control messages described above may be performed to modify the explicit list of UEs associated with a RAN UE Group.

Figure 17:
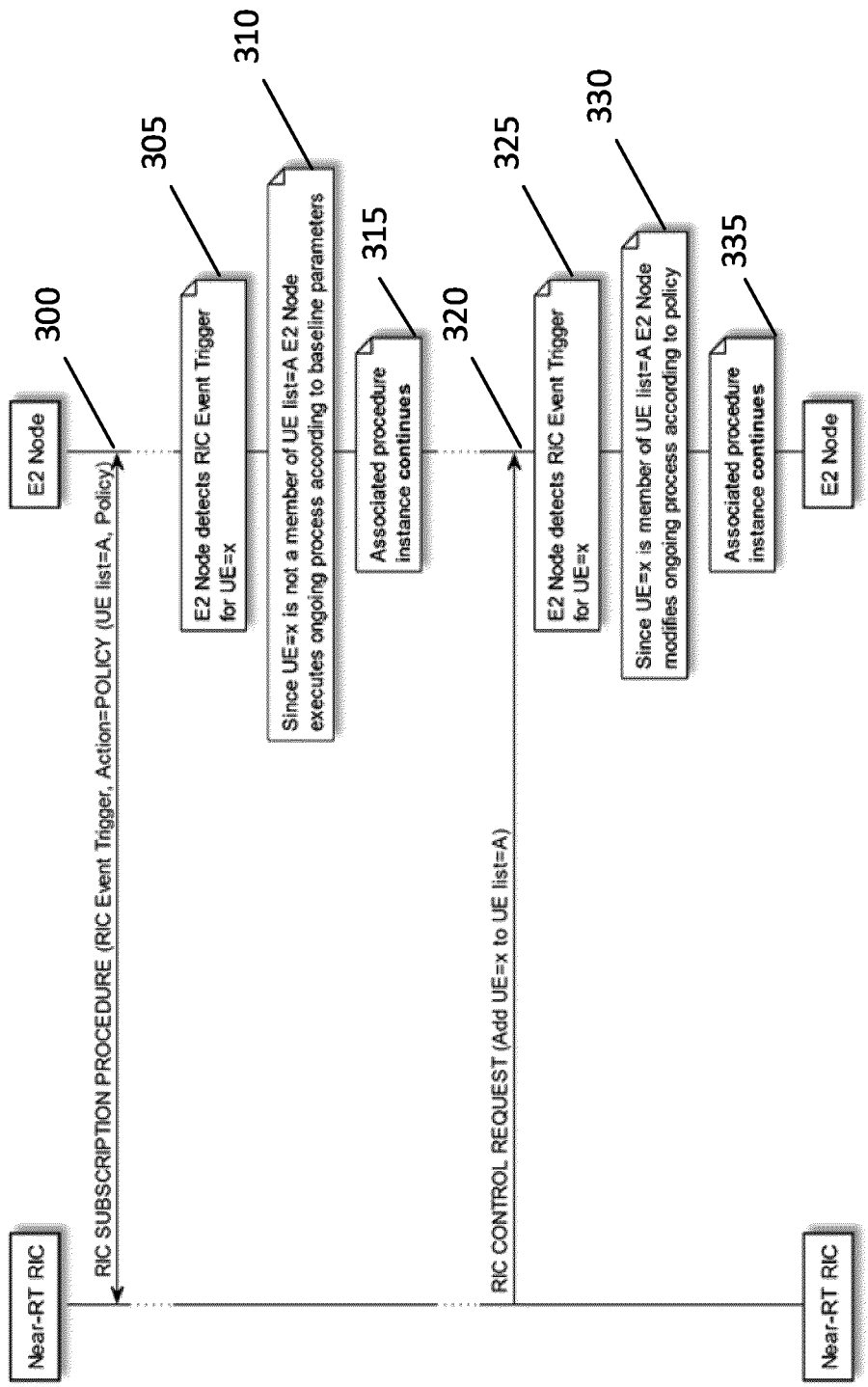
FIG. 17 illustrates a signal flow diagram of a method, according to an example embodiment.

FIG. 17 illustrates another signal flow diagram of another method, according to an example embodiment. As illustrated in FIG. 17, at 300, the near-RT RIC and E2 node may exchange RIC subscription procedure. In an example embodiment, the RIC subscription procedure may include a RIC event trigger, or action (policy) (UE list=A, policy). At 305, the E2 node may detect the RIC event trigger for UE=x. Then, at 310, since UE=x is not a member of the UE list=A, the E2 node may execute an ongoing process, such as the incoming SgNB Addition Request admission control process on an SgNB, according to certain baseline parameters, such as the OAM configured UE admission threshold level. Further, at 315, the associated procedure instance may continue at the E2 node, such as to continue handling the incoming SgNB Addition Request according to the decision made at 310. At 320, the near-RT RIC may send a RIC control request to the E2 node. In an example embodiment, the RIC control request may add UE=x to the UE list=A.

As further illustrated in FIG. 17, at 325, the E2 node may detect the RIC event trigger for UE=x. At 330, since UE=x is now a member of the UE list=A, the E2 node may modify ongoing processes according to the policy previously established at 300, such as the incoming SgNB Addition Request is either accepted or rejected according to the combination of OAM parameters and E2 Policy criteria. Further, at 335, the associated procedure instance may continue at the E2 node, such as to continue handling the incoming SgNB Addition Request according to the decision made at 330.

Figure 18:
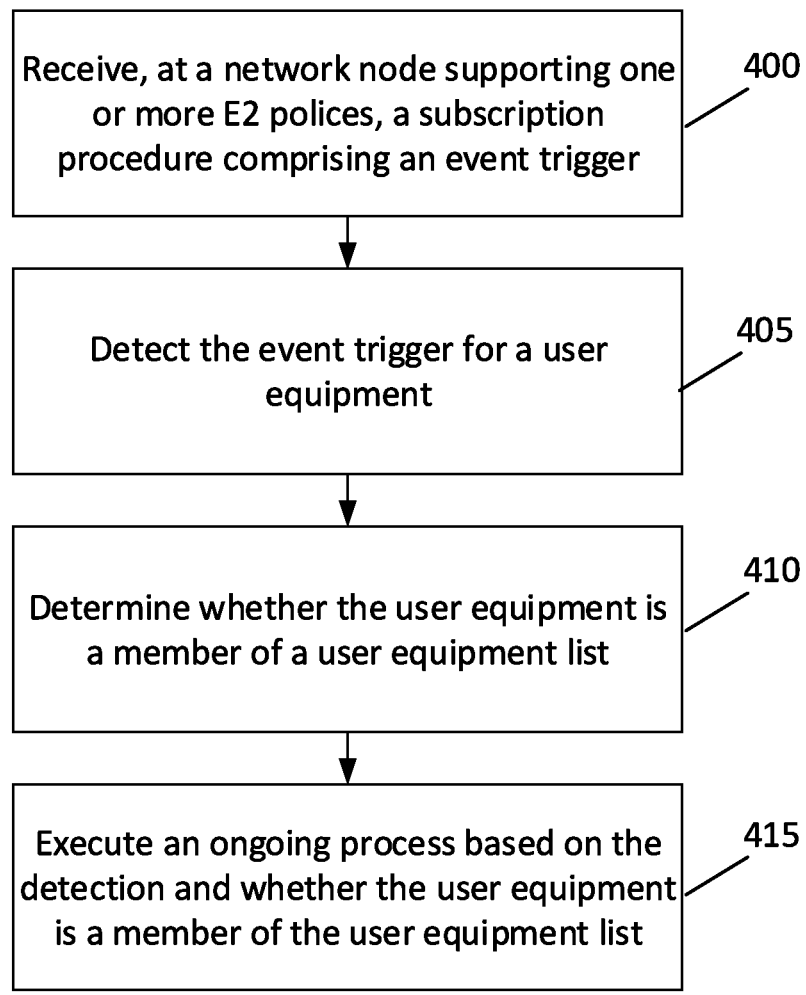
FIG. 18 illustrates a flow diagram of a method, according to certain example embodiments.

FIG. 18 illustrates a flow diagram of a method, according to certain example embodiments. According to certain example embodiments, the method of FIG. 18 may be performed by a network entity or a network node in a 3GPP system, such as LTE or 5G-NR. For instance, in certain example embodiments, the method of FIG. 18 may be performed by an E2 node, for instance, similar to apparatus 20 illustrated in FIG. 20(b).

According to certain example embodiments, the method of FIG. 18 may include, at 400, receiving, at a network node supporting one or more E2 polices, a subscription procedure comprising an event trigger. The method may also include, at 405, detecting the event trigger for a user equipment. The method may further include, at 410, determining whether the user equipment is a member of a user equipment list. In addition, at 415, the method may include executing an ongoing process based on the detection and whether the user equipment is a member of the user equipment list.

In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

According to certain example embodiments, the method may also include establishing the user equipment list as part of a radio access network intelligent controller subscription request message to establish the one or more E2 policies. According to certain example embodiments, the method may also include establishing or modifying the user equipment list as part of a subsequent E2 control request message that adds or deletes one or more user equipment from the user equipment list with a specific radio access network user equipment group defined in an E2 policy. According to other example embodiments, the method may further include maintaining the radio access network user equipment group and the user equipment list when the one or more E2 policies is modified using a subsequent E2 radio access network intelligent controller subscription request.

According to certain example embodiments, the user equipment list may be associated with the radio access network user equipment group, and the user equipment list may be implemented as marks in each individual user equipment context or other per user equipment data record in the radio access network. According to other example embodiments, the method may include receiving an E2 radio access network intelligent controller subscription request message to maintain a previously established user equipment list associated with the radio access network user equipment group. According to further example embodiments, the previously established user equipment list associated with the radio access network user equipment group may be implemented in an event trigger definition of an E2 subscription message when applied to one or more action types each including an E2 Report, an E2 Insert, or an E2 Policy action.

Figure 19:
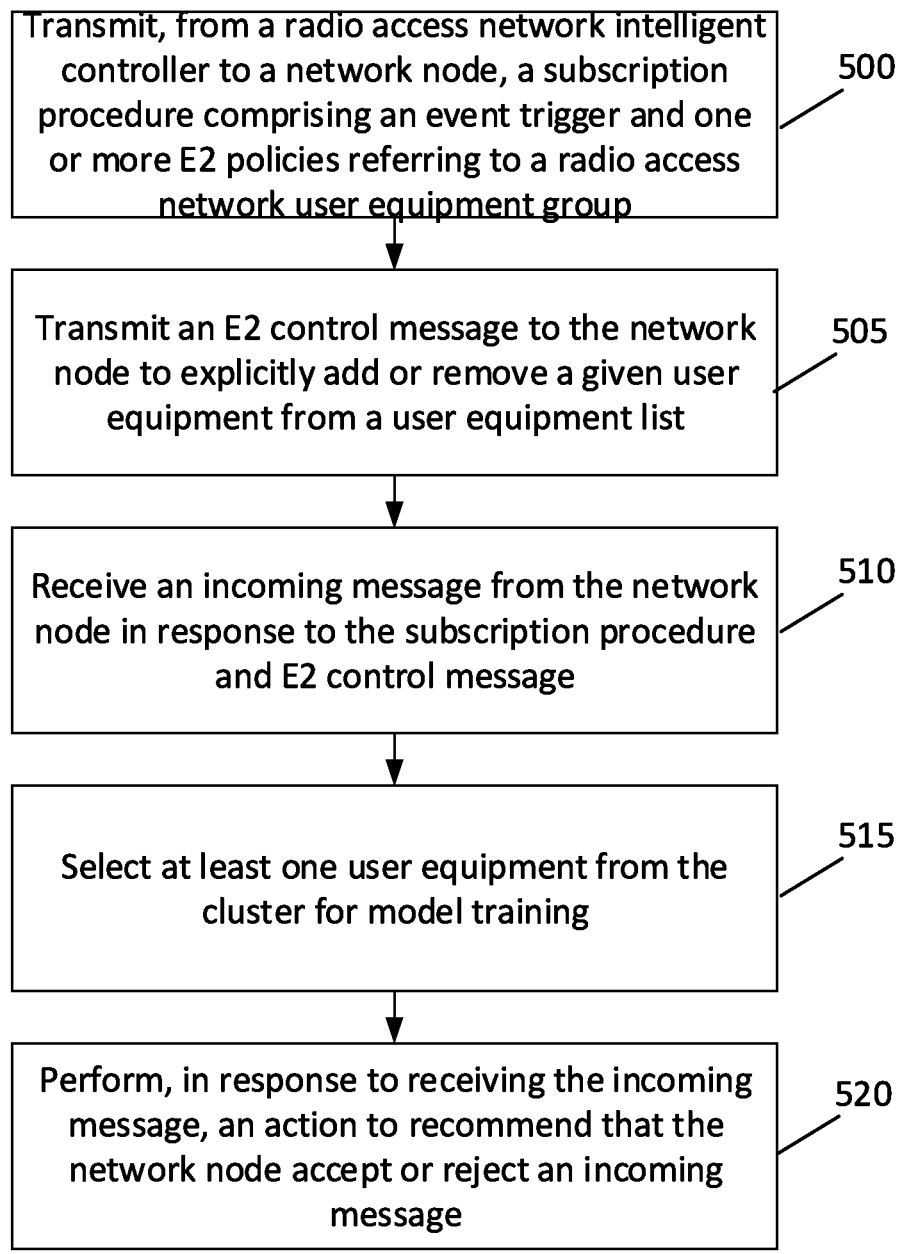
FIG. 19 illustrates a flow diagram of another method, according to certain example embodiments.

FIG. 19 illustrates a flow diagram of another method, according to certain example embodiments. According to certain example embodiments, the method of FIG. 18 may be performed by a network entity or a network node in a 3GPP system, such as LTE or 5G-NR. For instance, in certain example embodiments, the method of FIG. 19 may be performed by a near-RT RIC, for instance, similar to apparatus 20 illustrated in FIG. 20(b).

According to certain example embodiments, the method of FIG. 19 may include, at 500, transmitting, from a radio access network intelligent controller to a network node, a subscription procedure comprising an event trigger and one or more E2 policies referring to a radio access network user equipment group. The method may also include, at 505, transmitting an E2 control message to the network node to explicitly add or remove a given user equipment from a user equipment list. The method may further include, at 510, receiving an incoming message from the network node in response to the subscription procedure and E2 control message. Further, the method may include, at 520, performing, in response to receiving the incoming message, an action to recommend that the network node accept or reject an incoming message.

According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

According to certain example embodiments, the method may also include transmitting to the network node, an E2 radio access network intelligent controller subscription request message to maintain a previously established user equipment list associated with the radio access network user equipment group. In certain example embodiments, the E2 radio access network intelligent controller subscription request message may be transmitted using a same radio access network user equipment group identifier as in a subsequent radio access network intelligent controller subscription request message with an explicit indication in the subsequent radio access network intelligent controller subscription request message to maintain a previous radio access network user equipment group. In other example embodiments, the method may also include transmitting to the network node, an E2 radio access network intelligent controller subscription request message to maintain a previously established user equipment list associated with the radio access network user equipment group. In certain example embodiments, the E2 radio access network intelligent controller subscription request message may be transmitted using an explicit indication that a member of an explicit user equipment list associated with a previous radio access network user equipment group identifier in a previous E2 policy is to be used as an initial explicit user equipment list associated with the radio access network user equipment group in a subsequent E2 radio access network intelligent controller subscription request message.

According to certain example embodiments, the previously established user equipment list associated with the radio access network user equipment group may be implemented in an event trigger definition of the E2 radio access network intelligent controller subscription request message when applied to one or more action types each including an E2 Report, an E2 Insert, or an E2 Policy action. According to other example embodiments, the user equipment list may be associated with the radio access network user equipment group, and the user equipment list may be implemented as marks in each individual user equipment context or other per user equipment data record in the radio access network.

Figure 20A:
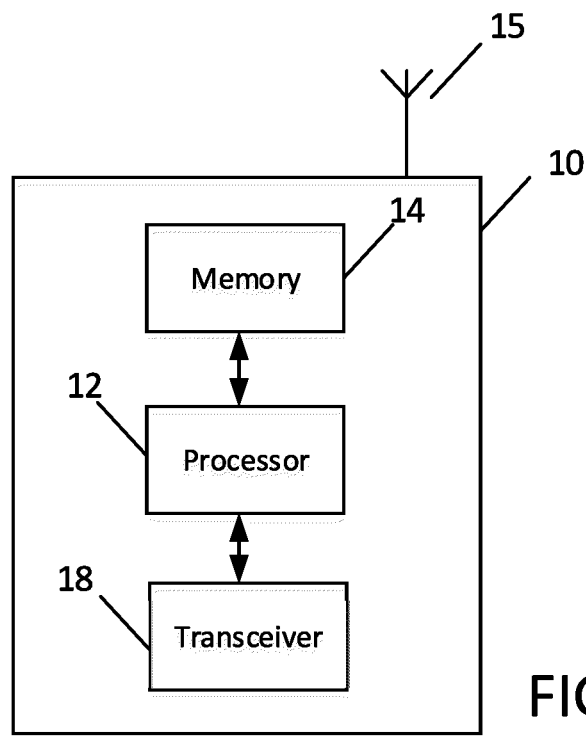
FIG. 20(*a*) illustrates an apparatus, according to an example embodiment.

FIG. 20(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. In certain example embodiments, the UE or UEs may be connected to DU (e.g., O-DU in O-RAN context) via radio units (RUs) (or O-RUs). As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 20(a).

As illustrated in the example of FIG. 19(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 19(*a*), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-17.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-17.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As introduced above, in certain embodiments, apparatus 10 may be a be a node or element in a communications network or associated with such a network, such as an E2 node, UE, mobile equipment (ME), mobile station, mobile device, stationary device, IoT device, or other device associated with a radio access network (RAN), such as an LTE network, 5G or NR. According to certain example embodiments, apparatus 10 may be controlled by memory 14 and processor 12 to perform the functions associated with any of the embodiments described herein. Further example embodiments may provide means for performing any of the functions, steps, or procedures described herein.

FIG. 20(*b*) illustrates an apparatus 20 according to an example embodiment. In an example embodiment, a near-RT RIC and non-RT RIC may act as server-like functions. However, in other example embodiments, the near-RT RIC and non-RT RIC may be each be combined with a normal base station and function and/or act like apparatus 20. As such, in certain example embodiments, near-RT RIC and non-RT RIC may be either integrated within the apparatus 20, or connected to such an apparatus using an E2 interface. According to an example embodiment, the apparatus 20 may be, network element, node, host, or server in a communication network or serving such a network. For example, apparatus 20 may be an E2 node corresponding to base transceiver station (BTS) or gNB. In other example embodiments the E2 node may be an O-eNB, CU-CP and CU-UP (in 5G connected by E1 interface), or O-CU-CP and O-CU-UP in the O-RAN context. According to certain example embodiments, the E2 node may be any node that terminates the E2 interface. This may include, for example, 4G eNB, 5G gNB, 5G gNB-DU, 5G gNB-CU, 5G gNB-CU-CP, or 5G gNB-CU-UP. In certain example embodiments, both RIC and the E2 node may be network elements.

According to certain example embodiments, when the E2 node is, for example, a 5G eNB, 5G gNB, and 5G gNB-DU, the E2 node may be presented by apparatus 20 with an antenna. According to other example embodiments, when the E2 node is, for example, a 5G gNB-CU, 5G gNB-CU-CP, and 5G gNB-CU-UP, the E2 node may be represented by apparatus 20 without an antenna. In other example embodiments, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 20(b).

Figure 20B:
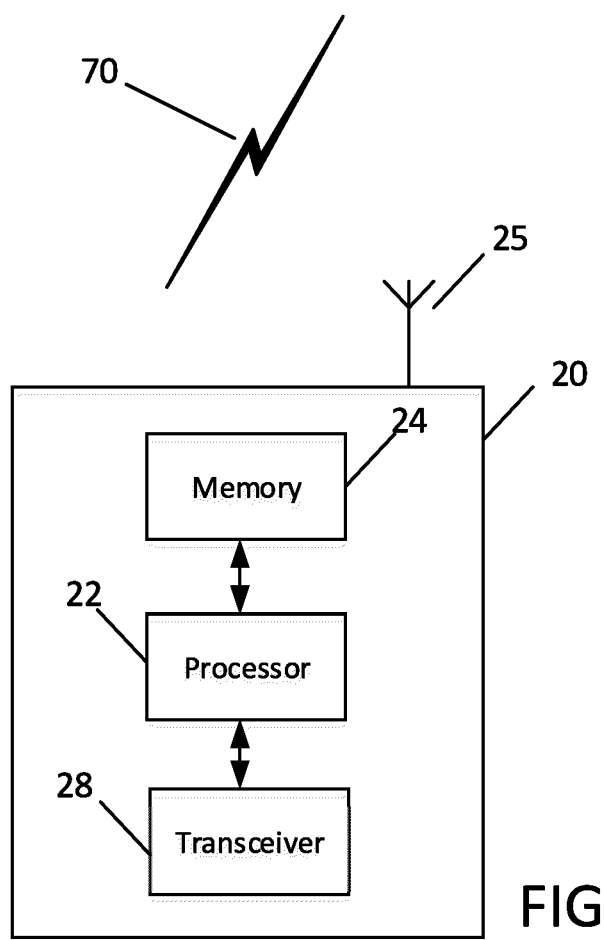

As illustrated in the example of FIG. 20(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 20(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-19.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-19.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a non-RT RIC, near-RT RIC, network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein. Further example embodiments may provide means for performing any of the functions, steps, or procedures described herein, such as those related to the E2 node, non-RT RIC, and near-RT RIC illustrated in at least in any of FIGS. 1-19.

For instance, apparatus 20 may be controlled by memory 24 and processor 22 to receive, at the apparatus supporting one or more E2 polices, a subscription procedure comprising an event trigger. Apparatus 20 may also be controlled by memory 24 and processor 22 to detect the event trigger for a user equipment. Apparatus 20 may further be controlled by memory 24 and processor 22 to determine whether the user equipment is a member of a user equipment list. In addition, apparatus 20 may be controlled by memory 24 and processor 22 to execute an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

In other example embodiments, apparatus 20 may be controlled by memory 24 and processor 22 to transmit, from the apparatus to a network node, a subscription procedure comprising an event trigger and one or more E2 policies referring to a radio access network user equipment group. Apparatus 20 may also be controlled by memory 24 and processor 22 to transmit an E2 control message to the network node to explicitly add or remove a given user equipment from a user equipment list. Apparatus 20 may further be controlled by memory 24 and processor 22 to receive an incoming message from the network node in response to the subscription procedure and E2 control message. In addition, apparatus 20 may be controlled by memory 24 and processor 22 to perform, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Further example embodiments may provide means for performing any of the functions, steps, or procedures described herein. For instance, one example embodiment may be directed to an apparatus that includes means for receiving, at the apparatus supporting one or more E2 polices, a subscription procedure comprising an event trigger. The apparatus may also include means for detecting the event trigger for a user equipment. The apparatus may further include means for determining whether the user equipment is a member of a user equipment list. In addition, the apparatus may include means for executing an ongoing process based on the detection and whether the user equipment is a member of the user equipment list. In certain example embodiments, the one or more E2 policies may include a portion defined as a radio access network user equipment group. In some example embodiments, the radio access network user equipment group may include a definition with a list of parameters to configure a matching procedure. In other example embodiments, the definition may include a list of explicitly nominated user equipment using one or more identifiers known to a radio access network node.

Other example embodiments may be directed to an apparatus that includes means for transmitting, from the apparatus to a network node, a subscription procedure comprising an event trigger and one or more E2 policies referring to a radio access network user equipment group. The apparatus may also include means for transmitting an E2 control message to the network node to explicitly add or remove a given user equipment from a user equipment list. The apparatus may further include means for receiving an incoming message from the network node in response to the subscription procedure and E2 control message. In addition, the apparatus may include means for performing, in response to receiving the incoming message, an action to recommend that the network node accept or reject an incoming message. According to certain example embodiments, the one or more E2 policies may include a portion defined as a radio access network user equipment group. According to other example embodiments, the radio access network user equipment group may include a definition with a list of parameters to configure a matching procedure. According to further example embodiments, the definition may include a list of explicitly nominated user equipment using one or more identifiers known to a radio access network node.

Certain example embodiments described herein provide several technical improvements, enhancements, and/or advantages. In some example embodiments, it may be possible to provide a mechanism for adding per-user equipment controls to radio intelligent controller E2 policies. It may also be possible to provide an E2 policy that may be defined using a mixture of parametric factors and explicit UE nomination. As such, it may be possible to address all the scope requirements from an A1 interface. In other example embodiments, it may be possible to provide an E2 control mechanism to provide a direct command that the RAN RRM is not required.

A computer program product may include one or more computer-executable components which, when the program is run, are configured to carry out some example embodiments described herein. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary
ARP Allocation and Retention Priority
CA Carrier Aggregation
CU-CP Centralized Unit-Control Plane
DC Dual Connectivity
eNB Enhanced Node B
gNB 5G or Next Generation NodeB
IE Information Element
IFLB Inter-Frequency Load Balancing
IMLB Idle Mode Load Management
LTE Long Term Evolution
MLB Mobility Load Balancing
NR New Radio
OAM Operations, Administration and Maintenance
O-RAN Open Radio Access Network
QCI QoS Class Identifier
QoS Quality of Service
RAN Radio Access Network
RIC RAN Intelligent Controller
RRM Radio Resource Management
SgNB Secondary gNB
SPID Service Profile Identifier
UE User Equipment

I claim:

1. A method, comprising:
receiving, at a network node supporting one or more network interface policies, a subscription procedure comprising an event trigger;
detecting the event trigger for a user equipment;
determining whether the user equipment is a member of a user equipment list;
executing an ongoing process based on the detection and whether the user equipment is a member of the user equipment list; and
receiving a network interface radio access network intelligent controller subscription request message to maintain a previously established user equipment list associated with the radio access network user equipment group,
wherein the one or more network interface policies comprises a portion defined as a radio access network user equipment group,
wherein the radio access network user equipment group comprises a definition with a list of parameters to configure a matching procedure,
wherein the definition comprises a list of explicitly nominated user equipment using one or more identifiers known to a radio access network node, and
wherein the previously established user equipment list associated with the radio access network user equipment group is implemented in an event trigger definition of a network interface subscription message when applied to one or more action types each comprising a network interface report, a network interface insert, or a network interface policy action.

2. The method according to claim 1, further comprising establishing the user equipment list as part of a radio access network intelligent controller subscription request message to establish the one or more network interface policies.

3. The method according to claim 1, further comprising establishing or modifying the user equipment list as part of a subsequent network interface control request message that adds or deletes one or more user equipment from the user equipment list with a specific radio access network user equipment group defined in a network interface policy.

4. The method according to claim 1, further comprising maintaining the radio access network user equipment group and the user equipment list when the one or more network interface policies is modified using a subsequent network interface radio access network intelligent controller subscription request.

5. The method according to claim 1,
wherein the user equipment list is associated with the radio access network user equipment group, and
wherein the user equipment list is implemented as marks in each individual user equipment context or other per user equipment data record in a radio access network.

6. An apparatus, comprising:
at least one processor; and
at least one memory comprising computer program code,
the at least one memory and the computer program code are configured, with the at least one processor to cause the apparatus at least to
receive, at the apparatus supporting one or more network interface policies, a subscription procedure comprising an event trigger;
detect the event trigger for a user equipment;
determine whether the user equipment is a member of a user equipment list;
execute an ongoing process based on the detection and whether the user equipment is a member of the user equipment list; and
receive a network interface radio access network intelligent controller subscription request message to maintain a previously established user equipment list associated with the radio access network user equipment group,
wherein the one or more network interface policies comprises a portion defined as a radio access network user equipment group,
wherein the radio access network user equipment group comprises a definition with a list of parameters to configure a matching procedure,
wherein the definition comprises a list of explicitly nominated user equipment using one or more identifiers known to a radio access network node, and
wherein the previously established user equipment list associated with the radio access network user equipment group is implemented in an event trigger definition of a network interface subscription message when applied to one or more action types each comprising a network interface report, a network interface insert, or a network interface policy action.

7. The apparatus according to claim 6, wherein the at least one memory and the computer program code are further configured, with the at least one processor to cause the apparatus at least to establish the user equipment list as part of a radio access network intelligent controller subscription request message to establish the one or more network interface policies.

8. The apparatus according to claim 6, wherein the at least one memory and the computer program code are further configured, with the at least one processor to cause the apparatus at least to establish or modify the user equipment list as part of a subsequent network interface control request message that adds or deletes one or more user equipment from the user equipment list with a specific radio access network user equipment group defined in a network interface policy.

9. The apparatus according to claim 6, wherein the at least one memory and the computer program code are further configured, with the at least one processor to cause the apparatus at least to maintain the radio access network user equipment group and the user equipment list when the one or more network interface policies is modified using a subsequent network interface radio access network intelligent controller subscription request.

10. The apparatus according to claim 6,
wherein the user equipment list is associated with the radio access network user equipment group, and
wherein the user equipment list is implemented as marks in each individual user equipment context or other per user equipment data record in a radio access network.

11. An apparatus, comprising:
at least one processor; and
at least one memory comprising computer program code,
the at least one memory and the computer program code are configured, with the at least one processor to cause the apparatus at least to
transmit, from the apparatus to a network node, a subscription procedure comprising an event trigger and one or more network interface policies referring to a radio access network user equipment group;
transmit a network interface control message to the network node to explicitly add or remove a given user equipment from a user equipment list;
receive an incoming message from the network node in response to the subscription procedure and network interface control message;
perform, in response to receiving the incoming message, an action to recommend that the network node accept or reject an incoming message; and
transmit to the network node, a network interface radio access network intelligent controller subscription request message to maintain a previously established user equipment list associated with the radio access network user equipment group,
wherein the one or more network interface policies comprises a portion defined as a radio access network user equipment group,
wherein the radio access network user equipment group comprises a definition with a list of parameters to configure a matching procedure,
wherein the definition comprises a list of explicitly nominated user equipment using one or more identifiers known to a radio access network node, and
wherein the network interface radio access network intelligent controller subscription request message is transmitted using a same radio access network user equipment group identifier as in a subsequent radio access network intelligent controller subscription request message with an explicit indication in the subsequent radio access network intelligent controller subscription request message to maintain a previous radio access network user equipment group.

12. The apparatus according to claim 11, wherein the previously established user equipment list associated with the radio access network user equipment group is implemented in an event trigger definition of the network interface radio access network intelligent controller subscription request message when applied to one or more action types each comprising a network interface report, a network interface insert, or a network interface policy action.

13. The apparatus according to claim 11,
wherein the user equipment list is associated with the radio access network user equipment group, and
wherein the user equipment list is implemented as marks in each individual user equipment context or other per user equipment data record in a radio access network.

14. An apparatus, comprising:
at least one processor; and
at least one memory comprising computer program code,
the at least one memory and the computer program code are configured, with the at least one processor to cause the apparatus at least to:
transmit, from the apparatus to a network node, a subscription procedure comprising an event trigger and one or more network interface policies referring to a radio access network user equipment group;
transmit a network interface control message to the network node to explicitly add or remove a given user equipment from a user equipment list;
receive an incoming message from the network node in response to the subscription procedure and network interface control message;
perform, in response to receiving the incoming message, an action to recommend that the network node accept or reject an incoming message; and
transmit to the network node, a network interface radio access network intelligent controller subscription request message to maintain a previously established user equipment list associated with the radio access network user equipment group,
wherein the one or more network interface policies comprises a portion defined as a radio access network user equipment group,
wherein the radio access network user equipment group comprises a definition with a list of parameters to configure a matching procedure,
wherein the definition comprises a list of explicitly nominated user equipment using one or more identifiers known to a radio access network node, and
wherein the network interface radio access network intelligent controller subscription request message is transmitted using an explicit indication that a member of an explicit user equipment list associated with a previous radio access network user equipment group identifier in a previous network interface policy is to be used as an initial explicit user equipment list associated with the radio access network user equipment group in a subsequent network interface radio access network intelligent controller subscription request message.

15. The apparatus according to claim 14, wherein the previously established user equipment list associated with the radio access network user equipment group is implemented in an event trigger definition of the network interface radio access network intelligent controller subscription request message when applied to one or more action types each comprising a network interface report, a network interface insert, or a network interface policy action.

16. The apparatus according to claim 14,
- wherein the user equipment list is associated with the radio access network user equipment group, and
- wherein the user equipment list is implemented as marks in each individual user equipment context or other per user equipment data record in a radio access network.

17. A non-transitory computer readable medium comprising program instructions stored thereon for performing the method according to claim 1.

\* \* \* \* \*